United States Patent
Kostigian et al.

(10) Patent No.: US 6,820,725 B2
(45) Date of Patent: Nov. 23, 2004

(54) SAFETY BRAKE ASSEMBLY

(75) Inventors: John V. Kostigian, Cambridge (CA); Frank C. Mitchell, Burlington (CA)

(73) Assignee: Galt Display Rack Company Limited, Cambridge (CA)

( * ) Notice: Subject to any disclaimer, the term of this patent is extended or adjusted under 35 U.S.C. 154(b) by 306 days.

(21) Appl. No.: 10/193,209

(22) Filed: Jul. 12, 2002

(65) Prior Publication Data

US 2003/0010579 A1 Jan. 16, 2003

(30) Foreign Application Priority Data

Jul. 13, 2001 (CA) .............................................. 2353112

(51) Int. Cl.$^7$ .............................................. F16D 51/60
(52) U.S. Cl. ...................... 187/372; 187/361; 187/376; 188/136
(58) Field of Search .............................. 187/208, 372, 187/376, 361; 188/189, 136

(56) References Cited

U.S. PATENT DOCUMENTS

| | | | | |
|---|---|---|---|---|
| 1,043,323 A | * | 11/1912 | Lester | 187/372 |
| 1,108,723 A | * | 8/1914 | Dolph | 187/372 |
| 1,389,867 A | * | 9/1921 | Griffin | 187/372 |
| 1,707,099 A | * | 3/1929 | Stein et al. | 187/372 |
| 3,215,231 A | * | 11/1965 | Lodige | 188/189 |
| 5,513,723 A | | 5/1996 | Luebke | |
| 6,105,728 A | * | 8/2000 | Combs, Jr. | 187/372 |

FOREIGN PATENT DOCUMENTS

| | | |
|---|---|---|
| CA | 2 090 354 | 1/1994 |
| CA | 2 124 916 | 8/1995 |

* cited by examiner

*Primary Examiner*—Eileen D. Lillis
*Assistant Examiner*—Thuy V. Tran
(74) *Attorney, Agent, or Firm*—Shapiro Cohen

(57) ABSTRACT

A safety brake assembly is disclosed comprising a housing movable on a vertical support, the housing attached to a carpet support arm, a pulley rotatably mounted on a shaft of the housing, a link having an inner end pivotally connected to the shaft and an outer end connected to a first end of a pivot bracket on the housing, a second end of the pivot bracket connected to a wedge-shaped member adjacent the pulley, and tensioning means connected intermediate the ends of the pivot bracket. In the event of cable failure, the upward pressure previously exerted on the pulley is released, causing a downward movement of the pulley and link, the movement transferred by means of the pivot bracket to cause upward movement of the wedge-shaped member which is forced up between the pulley and the vertical support, the resultant friction arresting further downward movement of the housing and carpet support arm.

1 Claim, 5 Drawing Sheets

SAFETY BRAKE ASSEMBLY

BACKGROUND OF THE INVENTION

This invention relates to a safety brake for a pulley and more particularly to a safety brake for a cable pulley of a carpet rack.

Where a rack is employed for displaying carpets using cables to raise and lower the carpets and support structures, there is a risk that the cables may become damaged or worn and break, with the falling carpet and support structure potentially resulting in damage to property or persons near the rack. A standard means of providing a safety brake entails the use of electrical sensing means to detect the cable absence from a given point in its usual course.

The development of the present invention was necessitated by the limitations of the standard cable braking means, as the standard means is unnecessarily complex and forces reliance on electrical detection.

In response to this problem, the present invention provides a relatively simple mechanical means for preventing damage due to cable failure, namely a carpet rack safety brake assembly as described below.

DESCRIPTION OF THE BACKGROUND ART

A carpet rack of the type having cable and pulleys for lifting carpets is disclosed in Canadian Patent No. 2,090,354 by the same inventor. In this prior patent, a worm gear winch is relied on to provide self-braking so that the winch drum cannot accidentally run free and allow the carpet support arm to descend rapidly.

It is also considered desirable, however, to prevent rapid descent of the carpet support arm in the event of a broken cable. Known cable brakes such as that shown in U.S. Pat. No. 5,513,723 are not entirely satisfactory due to reliance on electrical detection brake operators in the event of cable failure.

SUMMARY OF THE INVENTION

The principal object of this invention is to provide relatively simple mechanical means for preventing personal or property damage due to cable failure in a carpet display rack. Other objects will appear from the description and the drawings.

Accordingly, the present invention provides a safety brake assembly comprising a housing movable on a vertical support, the housing attached to a carpet support arm, a pulley rotatably mounted on a shaft of the housing, a link having an inner end pivotally connected to the shaft and an outer end connected to a first end of a pivot bracket on the housing, a second end of the pivot bracket connected to a wedge-shaped member adjacent the pulley, and tensioning means connected intermediate the ends of the pivot bracket. In the event of cable failure, the upward pressure previously exerted on the pulley is released, causing a downward movement of the pulley and link, so that the movement is transferred by means of the pivot bracket to cause upward movement of the wedge-shaped member which is forced between the pulley and the vertical support, the resultant friction arresting further downward movement of the housing and carpet support arm.

BRIEF DESCRIPTION OF THE DRAWINGS

In the drawings which illustrate embodiments of this invention.

DETAILED DESCRIPTION OF A PREFERRED EMBODIMENT

Figure 1:
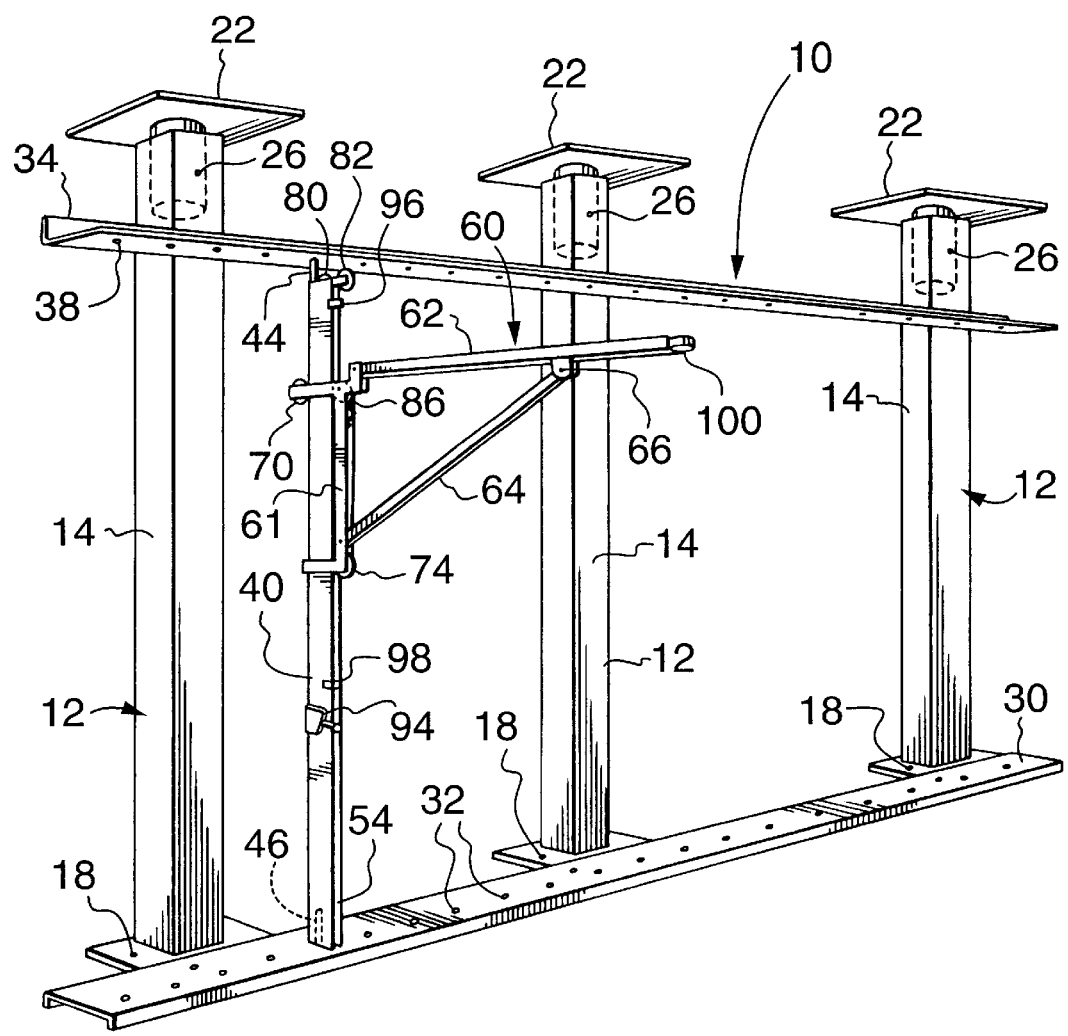
FIG. 1 is a perspective view of the display rack provided with the safety brake of this invention.

Referring now in detail to the Figures in which the numeral 10 generally denotes a carpet display rack and the numeral 11 generally denotes a safety brake assembly, the rack 10 has a supporting assembly 12 including posts 14 having bottom plates 18. The posts 14 are also provided with adjustable top plates 22 secured in the adjusted position by set screws 26.

A lower channel plate 30 has spaced apart apertures 32 and a top plate 34 of right angle cross section which has apertures 38 vertically aligned with the apertures 32 of the lower plate 30. Vertical support members 40 of C shaped cross section (one of which is shown in FIG. 1) have upper and lower pins 44 and 46 adapted to be received in the apertures 38 and 32, respectively, for pivotal movement. It will be noted that the upright member 40 has a channel 54.

Figure 2:
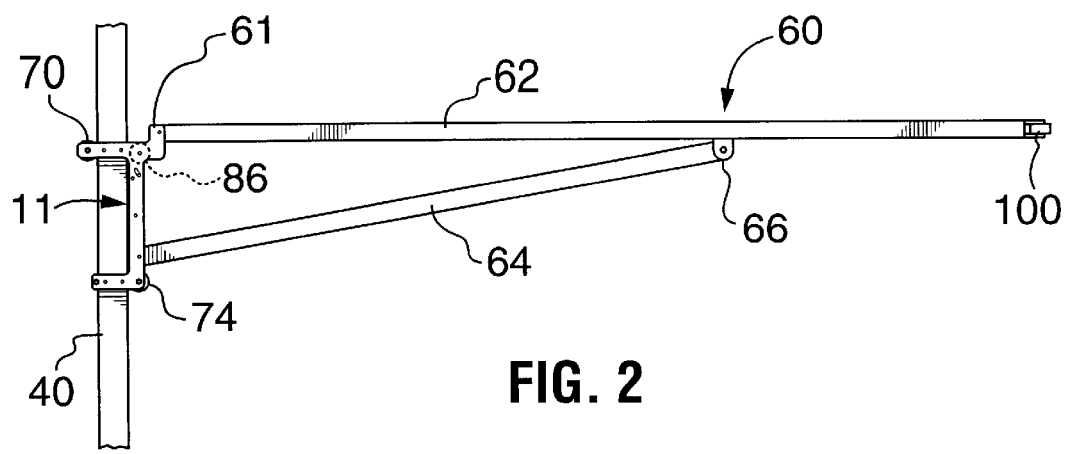
FIG. 2 is a side elevational view of the arm assembly of FIG. 1.
Figure 6:
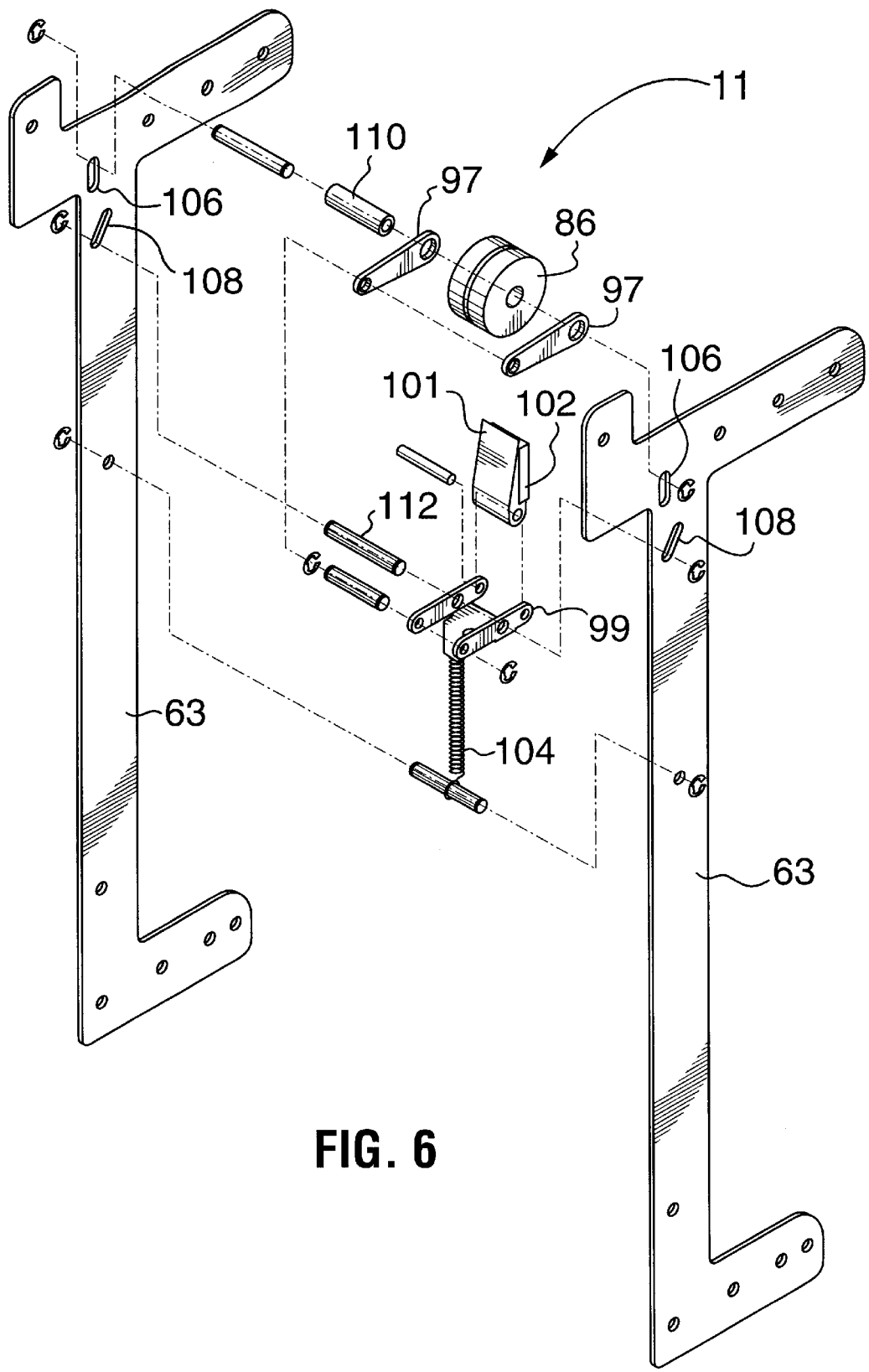
FIG. 6 is an exploded perspective view of a preferred embodiment of the safety brake assembly.

As can best be seen in FIG. 2, an arm assembly 60 adapted to move vertically on the upright channel member 40 includes a housing 61, a horizontal member 62, and a diagonal brace 64 secured by securing means 66 to horizontal member 62. The housing 61 compresses two spaced apart plates 63 as shown in FIG. 6. An associated end of the arm 60 is secured to the housing which is mounted for vertical movement on the upright tubular member 40. A roller 70 mounted at the upper end of housing 61 engages the other side of tubular member 40. The lower end of brace 64 is secured to housing 61, and a roller 74 on the lower end of housing 61 bears against the side of tubular member 40 opposite to that engaged by roller 70. The end of horizontal member 62 opposite vertical support member 40 is fitted with nylon roller 100 for use with attaching a carpet for display.

Figure 3:
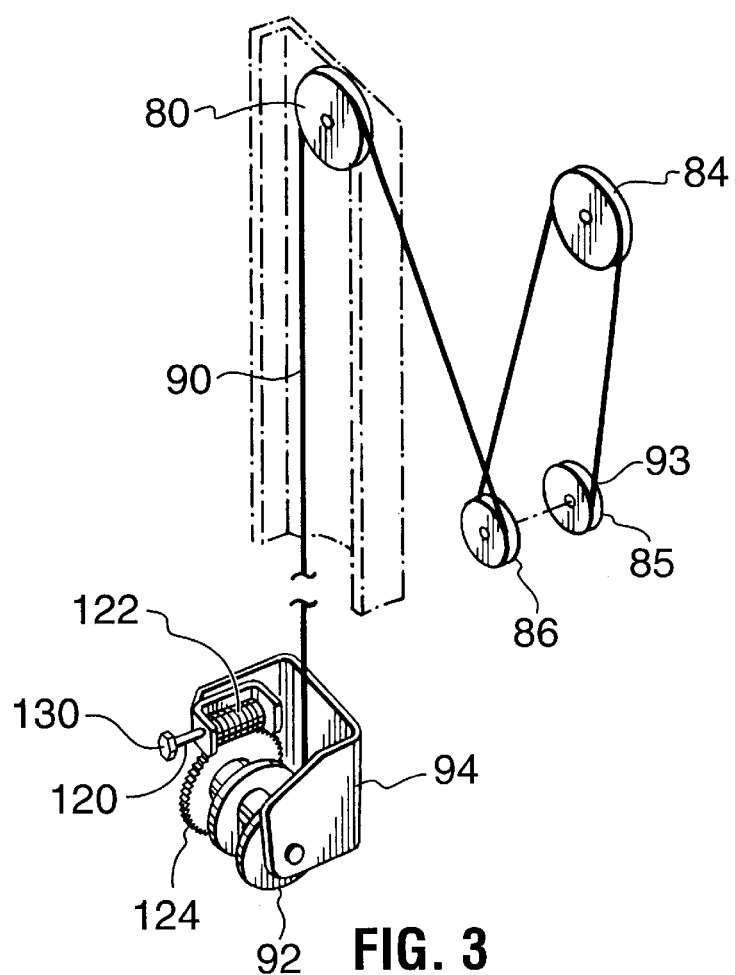
FIG. 3 is a diagrammatic view of the cable and pulley of FIG. 1.

As shown more clearly in FIG. 3, a pulley 80 is mounted for rotation in a conventional manner in channel 54. One additional pulley 84 is mounted on the outside of tubular upright 40 adjacent pulley 80. A third pulley 86 is mounted on horizontal member 62 adjacent upright member 40.

As further illustrated in FIG. 3, a cable 90 wound on a drum 92 of a winch 94 entrains pulley 80, then pulley 86 on horizontal member 62, then extends over pulley 84 at the top of vertical support member 40, and has its end 93 looped over fastening means 85 adjacent pulley 86. Stop plates 96 and 98 are attached to vertical support member 40 to control vertical movement of arm assembly 60.

The winch 94 is of the type referred to as a worm gear winch and includes a shaft 120. A worm gear 122 is driven by shaft 120 and meshes with gear 124 for rotating winch drum 92. A hexagonal nut 130 is secured to shaft 120 in a conventional manner such as welding to facilitate turning the shaft through the use of portable drive means such as an electric drill. Winch 94 is self-braking so that winch drum 92 cannot accidentally run free.

Figure 4:
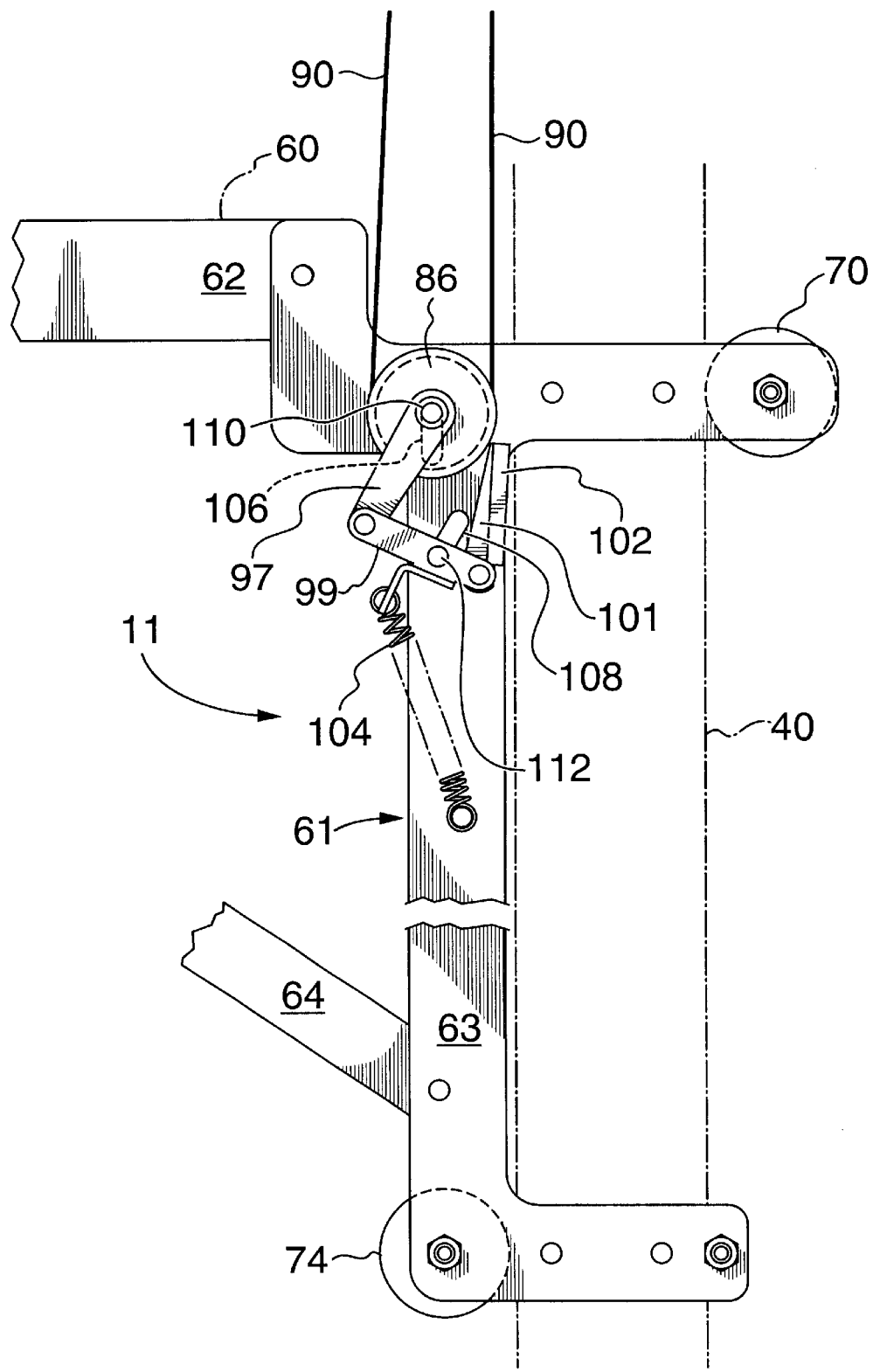
FIG. 4 is a side view of an arm housing and brake in position before the cable breaks.
Figure 5:
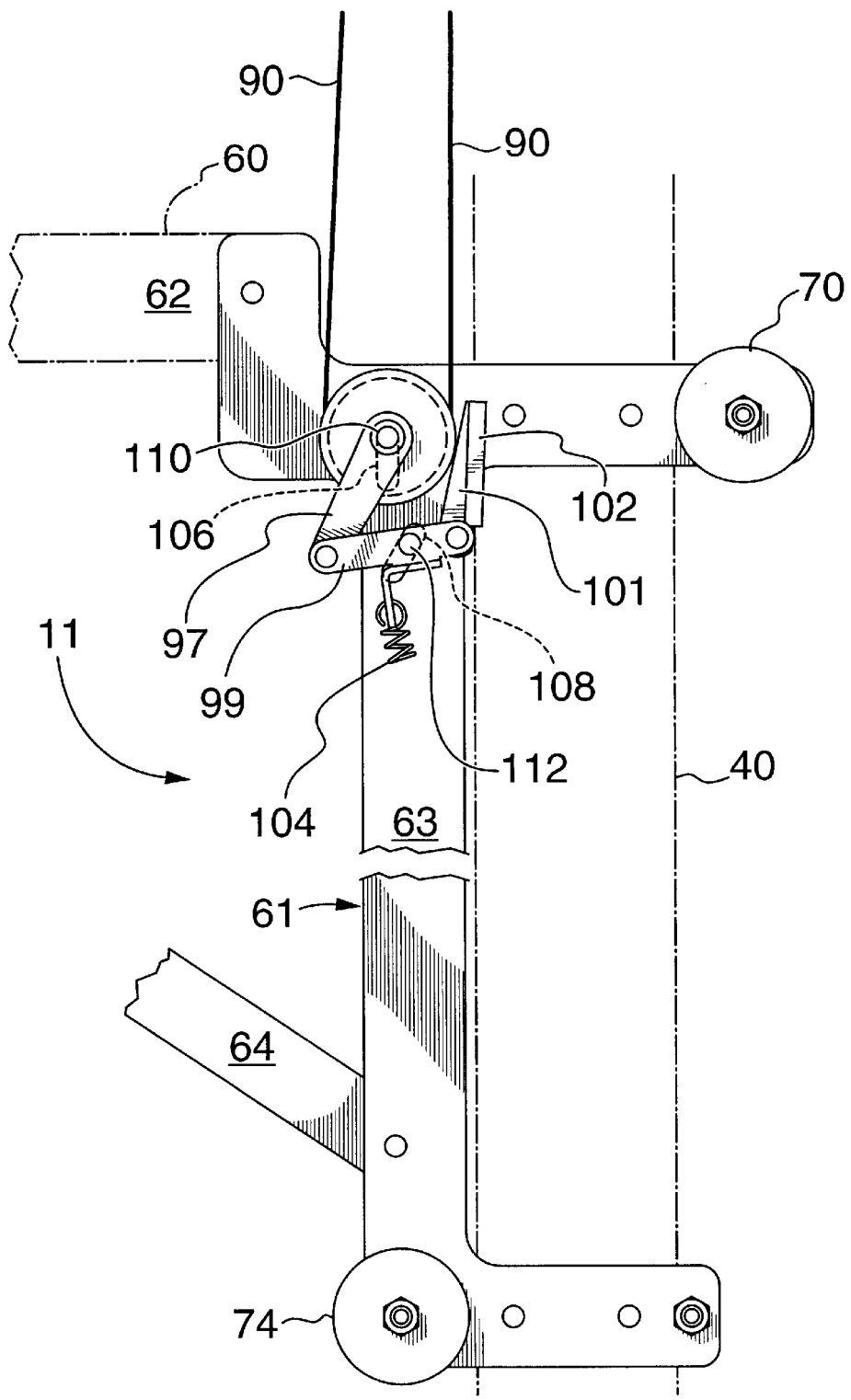
FIG. 5 is a side view of an arm housing and brake in position after the cable breaks.

As is best seen in FIGS. 4, 5, and 6, the invention comprises a safety brake assembly 11 that can be used in connection with carpet display rack 10, described above. The safety brake assembly 11 includes the housing 61, providing attachment points for horizontal member 62 and diagonal brace 64. The housing 61 also contains rollers 70 and 74 at its upper and lower ends, respectively. The safety brake assembly 11 further comprises pulley 86, a link 97 connecting pulley 86 to a pivot bracket 99, pivotally secured to the housing by a pivot bracket pin 112, a wedge-shaped member 101 being connected to the opposite end of pivot bracket 99, and tensioning means 104 attached intermediate pivot bracket 99. The pulley pin 110 that passes through pulley 86 is movably housed within pulley slot 106, providing the possibility of vertical movement of pulley 86. The pivot bracket pin 112 is movably housed within pivot bracket slot 108, providing the possibility of diagonal movement of pivot bracket pin 112 within pivot bracket slot 108. A rubber pad 102 is attached to the surface of wedge-shaped member 101, for facial engagement with vertical support member 40.

Having fitted carpet display rack 10 with safety brake assembly 11 described above, the utility of the present invention becomes clear in the following situation. As can be seen most clearly in FIG. 4, pulley 86 is normally pulled upward by the presence of cable 90, with pulley pin 112 pulled up to the top of pulley slot 106. In the event of cable failure, as can be seen most clearly in FIG. 5, the upward pressure previously exerted on pulley 86 is released, causing a downward movement of pulley 86 and link 97, the movement transferred by means of pivot bracket 99 as assisted by tensioning means 104 to cause upward movement of wedge-shaped member 101. Wedge-shaped member 101 and the attached rubber pad 102 are accordingly forced up between pulley 86 and vertical support member 40, the resultant friction arresting further downward movement of housing 61 and arm assembly 60.

A similar system could be used on other types of cable systems, display or storage racks to provide an additional safety mechanism in the event of cable breakage.

It will be clear to any person skilled in the art that modifications of and adjustments to this invention, not shown, are possible without departing from the spirit of the invention as demonstrated through the preferred embodiment, as is the use of the present invention or variants with other types of display or storage racks to prevent personal injury or property damage.

What is claimed is:

1. A safety brake assembly comprising:

a housing movable on a support;

a pulley rotatably mounted on a shaft on the housing;

a link having an inner end pivotally connected to the shaft;

an outer end of the link connected to a first end of a pivot bracket on the housing, a second end of the pivot bracket connected to a wedge-shaped member adjacent the pulley; and tensioning means connected intermediate the ends of the pivot bracket;

whereby said pulley is capable of downward movement in the event of a broken cable, said downward movement causing upward movement of the second end of the pivot bracket whereby the wedge-shaped member is urged by the tensioning means into engagement with the pulley and the support.

* * * * *

UNITED STATES PATENT AND TRADEMARK OFFICE
CERTIFICATE OF CORRECTION

PATENT NO.        : 6,820,725 B2
APPLICATION NO. : 10/193209
DATED             : November 23, 2004
INVENTOR(S)       : Kostigian et al.

It is certified that error appears in the above-identified patent and that said Letters Patent is hereby corrected as shown below:

Title page, item (73) Assignee: delete "Galt Display Rack Company Limited" and insert --JVK Holdings Inc.--

Signed and Sealed this

Eighth Day of May, 2007

JON W. DUDAS
*Director of the United States Patent and Trademark Office*